United States Patent [19]
Riano

[11] 4,043,717
[45] Aug. 23, 1977

[54] SULPHUR GRANULATOR

[75] Inventor: Marcos D. Riano, Bakersfield, Calif.

[73] Assignee: Valley Nitrogen Producers, Inc., Helm, Calif.

[21] Appl. No.: 675,905

[22] Filed: Apr. 12, 1976

[51] Int. Cl.² .......................................... B29C 23/00
[52] U.S. Cl. ........................................ 425/7; 264/12; 23/252 R; 23/278
[58] Field of Search ............... 425/7, 461; 264/12; 23/278, 252 R, 277 R, 262, 280, 293 A, 293 S

[56] References Cited

U.S. PATENT DOCUMENTS

| | | | |
|---|---|---|---|
| 813,785 | 2/1906 | Huguenot | 425/7 |
| 1,751,624 | 3/1930 | Du Bral | 264/12 X |
| 2,508,462 | 5/1950 | Marshall | 264/12 |
| 2,676,358 | 4/1954 | Messner | 264/12 X |
| 3,346,677 | 10/1967 | Kinsell | 264/12 |
| 3,588,951 | 6/1971 | Hegmann | 264/12 X |
| 3,830,631 | 8/1974 | Young et al. | 425/7 X |

Primary Examiner—Robert L. Spicer, Jr.
Attorney, Agent, or Firm—Richard H. Zaitlen

[57] ABSTRACT

A device for preparing granular sulphur particles from a stream of molten sulphur is disclosed. The device comprises an elongated conduit for moving the molten sulphur which has a uniquely designed spray head coupled at one end thereof. The spray head has a nozzle opening to discharge the sulphur. A helical member is disposed inside of the spray head adjacent the nozzle opening such that when the sulphur exits out of the spray head, it forms a deluge-type spray. A water jacket is circumferentially disposed about the sulphur conduit adjacent the spray head so as to form an annular orifice thereabout. The annular orifice is located behind the nozzle opening such that as the molten sulphur exits out of the spray head, it comes in direct contact with an annular water spray. Impingement of the water on the molten sulphur causes the sulphur to form into irregular granular pellets which are very porous. By the use of the spray head and water jacket of the present invention, pelletized sulphur all being of a specific mesh size range is produced. This type of sulphur has been found to be readily usable as a fertilizer and overcomes the problems of fire hazards associated with sulphur powders or pellets produced under prior art methods.

9 Claims, 3 Drawing Figures

SULPHUR GRANULATOR

BACKGROUND OF THE INVENTION

1. Field of the Invention

The present invention relates to devices used in the manufacture of sulphur, and more specifically, to a spray head which contains a means for producing deluge-type spray of molten sulphur.

2. Prior Art

It has long been recognized that elemental sulphur can be used directly as a fertilizer by placing the powdered sulphur on the ground. Elemental sulphur has also found wide utility in the manufacturing of other compounds, such as, for example, sulphuric acid. Both as a fertilizer and in the production of other compounds, it is many times necessary to cause the sulphur particles to break down into a form which is readily accepted by the soil or is easily dissolvable. Elemental sulphur is generally obtained in large chunks or slabs which must be mechanically broken up before final distribution by the user. This operation of breaking up the solidified chunks of sulphur is time consuming and expensive. Thus, the prior art has sought solutions whereby the sulphur is formed into smaller particles.

One such prior art technique is disclosed by Crowley, et al. (U.S. Pat. No. 1,718,334). In the method and apparatus disclosed by Crowley, an atomizer is emersed in a bath of molten sulphur with the tip of the atomizer approximately even with the level of the sulphur bath. Air is forced through the sulphur bath and through the spraying chamber of the atomizer thereby drawing the sulphur from the bath into the spraying chamber. As the sulphur exits from the atomizer, it is caused to form into small particles. Such a prior art device has, as its major shortcoming, the fact that such atomized sulphur particles are extremely fine grain and will pass through a 300 mesh screen. Such fine grain sulphur, while perhaps useful in some operations, has been found to be a fire hazard when such sulphur is used in many applications such as during fertilization. Moreover, such finely divided sulphur is susceptible to problems associated with dust in that it is extremely flammable.

Another prior art device is disclosed by Young, et al. (U.S. Pat. No. 3,830,361). Young, et al. disclose an apparatus in which concentric annular orifices form outlets for sulphur and water respectively. The sulphur orifice is configured such that the sulphur impines upon a conical shaped member which causes the sulphur stream to break up into finely divided particles. The annular water stream to a less extent impinges on the conical shaped member and comes in contact with the sulphur particles. While such a device does cause the particles to be formed in a desirable particle size, it is extremely complex and requires the formation of at least two annular orifices as well as various heating chambers. Finally, such a device requires a specifically shaped conical member for impingement of the annular sulphur stream.

The present invention is directed towards a sulphur granulator for producing granulated sulphur particles having high porosity, and which contains none of the aforementioned problems associated with prior art devices.

BRIEF SUMMARY OF THE INVENTION

The present invention relates to an apparatus and more specifically, to a sulphur granulator used to produce porous particles of granulated sulphur. The granulator comprises an elongated hollow sulphur conduit such as a pipe and the like, which has a uniquely designed bullet-shaped spray head coupled at one end thereof. The spray head has a substantially circular nozzle opening for discharging the sulphur and a helically shaped member disposed inside of the spray head adjacent the nozzle opening. The circular nozzle and helically shaped member are arranged and configured such that a deluge-type sulphur spray is produced. A water jacket is circumferentially disposed about the sulphur conduit adjacent the spray head and behind the spray head so as to form an annular opening. The annular opening permits water to exit from the water jacket such that a sufficient dispersion of the water is achieved. This permits the water to contact the droplets of sulphur and to cause them to solidify into small granules. As the particles fall to the ground, continued air and water cooling takes place which produces an irregular granular sulphur particle which is extremely porous and has a mesh size of from about 6–20 mesh.

In operating the sulphur granulator of the present invention, molten sulphur is pumped through the sulphur conduit at a sufficient flow rate such that when it comes in contact with the helically shaped member disposed in the spray head, a deluge-type spray is created as the spray exits out of the nozzle opening. Water is pumped into the water jacket at a sufficient rate such that it too is sprayed out of the annular opening of the water jacket adjacent the nozzle opening. Because sufficient water pressure and sulphur pressure is used, the present invention enables large quantities of fine divided, porous sulphur particles to be produced. Moreover, because an agitating means (the helically shaped member) is used adjacent the opening of the spray head, and because the spray head is a generally circular opening, clogging of the spray head which was a significant problem in prior art devices is substantially eliminated.

The novel features which are believed to be characteristic of the invention, both as to its organization and method of operation, together with further objectives and advantages thereof, will be better understood from the following description considered in connection with the accompanying in which a presently preferred embodiment of the invention is illustrated by way of example. It is to be expressly understood, however, the drawings are for the purpose of illustration and description only, and are not intended as a definition of the limits of the invention.

DETAILED DESCRIPTION OF THE INVENTION

Figure 1:
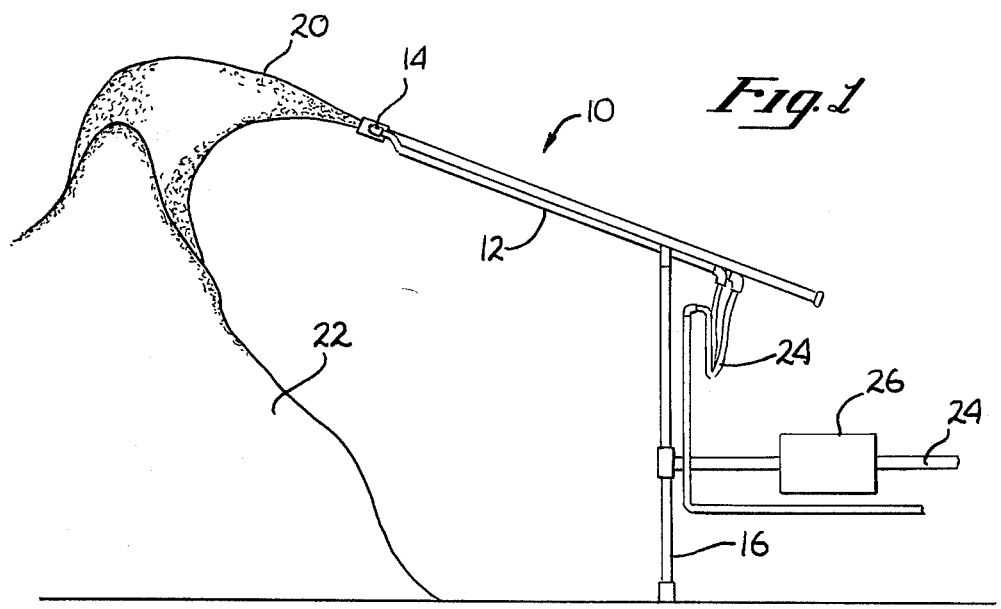
FIG. 1 is a general view showing the sulphur granulator of the present invention.

Referring first to FIG. 1, there is shown the sulphur granulator 10 of the present invention. The granulator 10 is comprised of a sulphur conduit 12 having a uniquely designed spray head 14 coupled to one end of the conduit 12. In the present embodiment, the sulphur conduit 12 is rotatably coupled to the end of an upward extending support member 16. This permits the spray head 14 to be directed to various areas such that the stream 20 which exits out of the spray head 14 forms a high pile of sulphur particles 22 in a desired location. Of course, because the conduit 12 is rotatably mounted to support 16, the spray 20 can be directed to a railroad car and the like. Flexible tubing 24 delivers the molten sulphur to the conduit 12. To maintain the sulphur in a molten condition, a heating means may be used therewith. For example, heating means 26 may be disposed along the length of the tubing 24. Additional heating means may also be disposed about the conduit 12. The heating means 26 is used to maintain the sulphur in its molten condition and heats the sulphur to approximately 290° Fahrenheit. Such heating means are well known in the art and use heated fluids or steam coils to maintain the temperature of the sulphur. To prevent heat loss, conduit 12 is usually insulated further maintaining the molten condition of the sulphur.

Figure 2:
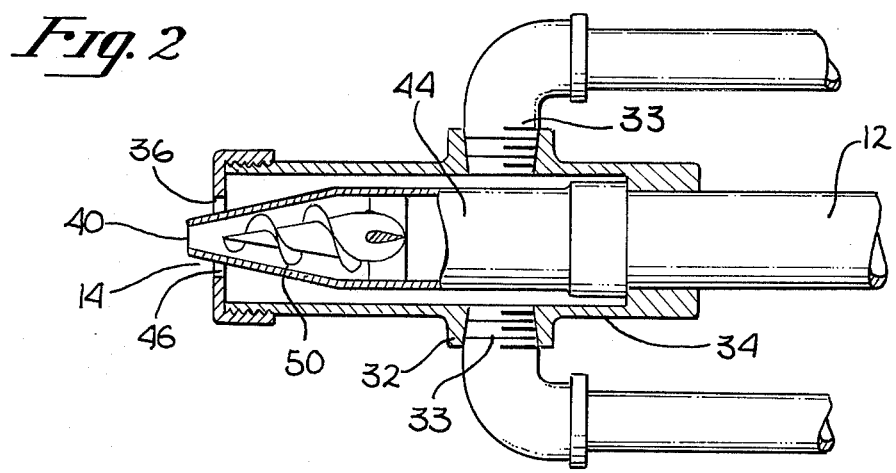
FIG. 2 is a front cutaway view showing the spray head and the associated water jacket.
Figure 3:
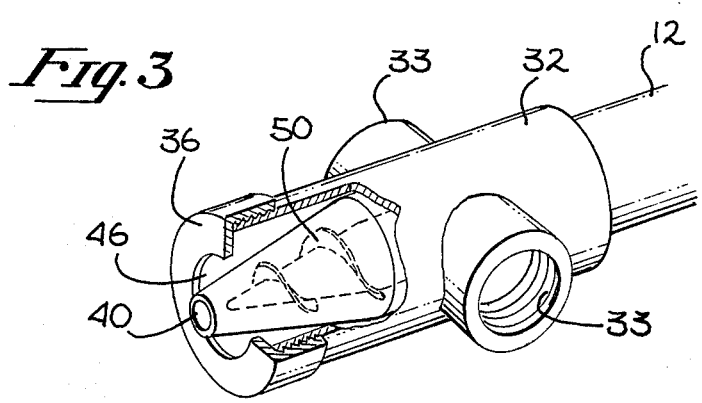
FIG. 3 is a cutaway perspective view showing the water jacket forming an annular orifice about the sulphur conduit and the helical member disposed in the spray head adjacent the nozzle opening.

Referring now to FIGS. 2 and 3, one can see that as the sulphur is pumped through the conduit 12, it will eventually reach an area encircled by water jacket 32. Such water jackets are well known in the art and do not represent in itself a point of novelty of the present invention. However, it should be noted that the placement of the water jacket 32 is not a mere matter of choice. Rather, it is circumferentially disposed about the conduit 12 such that end 34 forms a watertight seal about the conduit 12. End 36 creates an annular orifice behind and adjacent to the nozzle opening 40 of the spray head 14. In the preferred embodiment, water at about 15°-25° C is forced through jacket 32 via inlets 33 such that an annular water spray is created at its orifice 46. It has been found that about 1-5 gal./min. through orifice 46 is sufficient to create the desired spray shape and cool the sulphur as hereinafter discussed. Jacket 32 also acts to precool the molten sulphur such that substantially less water is necessary to get the sulphur to form the desired particles.

The spray head 14 is securely coupled to the end 44 of the conduit 12. In the preferred embodiment head 14 is screwed onto conduit 12. This enables the head 14 to be easily removed for cleaning and/or repair. Inside of the spray head 14 is a helically shaped screw member 50. Screw member 50 acts as an agitator means and causes the molten sulphur to travel in a circular path adjacent the inner periphery of conduit 12 and head 14. Such screw member 50 is similarly shaped to a screw conveyor or extruder the length of which is coupled to the inner wall of the head 14.

Referring now to FIG. 3, one can see the relative position of the water jacket 32 which forms the outer pipe circumferentially disposed about the bullet-shaped inner spray head 14 and the conduit 12. The screw member 50 is shown in its preferable helical shape inside of the head 12 adjacent the nozzle opening 40. In operating the granulator 10, as the sulphur approached the helical screw head 50, it is caused to travel in a curvilivear direction. When the sulphur reaches the nozzle opening 52, such curvilinear movement causes the spray 20 to form what is referred to in the art as a deluge-type spray. Such a spray formation is similar to that created in a deluge-type shower and causes the sulphur to break up into small droplets. Impingement of the sulphur with the annular water spray causes the sulphur to further break up into small irregularly shaped pellets or granules with some of the water adhering to the granules. Because the head 14 is disposed atop a relatively high platform, the free-falling action of the sulphur further causes solidification and pore formation of the particles. This is thought to be due to the combination of air and water cooling. Moreover, such falling action causes much of the water to be expelled from the sulphur particles enabling quick drying to be achieved. Thus, in the preferred embodiment, it is necessary that member 16 be of a sufficient height to cause pore formation and substantial solidification. It is further believed that the continuous orifice on the spray head 14 enables the sulphur to spray out in such a manner that, in combination with the annular water spray, further encourages the porous aspects of the sulphur. In many prior art devices impingement of the sulphur prior to cooling or mixing of sulphur and water prior to spraying caused the sulphur particles to become harder (more dense) and thus more difficult to dissolve or be absorbed by the soil.

Such granules thus produced are very porous and thus have a very high surface area. This enables the sulphur to be absorbed by the soil or dissolve in another liquid. The sizes of particles have a sieve mesh size of from approximately −6 to +20. Those associated with the prior art had a much larger particle size and were not nearly as porous as the present invention. In the preferred embodiment, opening 40 is about ⅜ inch and permits approximately 60 gal/min of sulphur spray to pass there through.

It should be understood that while the preferred examples described hereinabove deal with certain shapes for the spray head 14, other configurations can also be used. Moreover, it will be apparent to one skilled in the art that other changes and modifications can be made without departing from the spirit and scope of the present invention as defined in the claims herein.

I claim:
1. A sulphur granulator for preparing granular sulphur from a stream of molten sulphur comprising:
 a. a sulphur conduit having a uniquely designed spray head coupled at one end thereof, said spray head having a nozzle opening with a continuous cross-section configured orifice to discharge said sulphur in a deluge spray and a means for agitating said molten sulphur, said means for agitating disposed in said spray head adjacent said nozzle opening; and
 b. a water jacket circumferentially disposed about said sulphur conduit adjacent said spray head so as to form an annular orifice, said annular orifice terminating behind said nozzle opening.

2. The sulphur granulator of claim 1 wherein said means for agitating said molten sulphur spins said sulphur.

3. The sulphur granulator of claim 1 wherein said means for agitating said molten sulphur is a helically shaped member.

4. The sulphur granulator of claim 1 wherein up to about 60 gal/min of sulphur exists out of said spray head.

5. The sulphur granulator of claim 1 wherein heating means is disposed on said sulphur conduit for heating said sulphur.

6. The sulphur granulator of claim 1 wherein said spray head has a bullet shape.

7. A device for preparing granular sulphur from a stream of molten sulphur comprising:
 a. a sulphur conduit having a uniquely designed bullet shaped spray head coupled to one end thereof, said spray head having a nozzle opening with a continuous cross-section configured orifice to discharge said sulphur in a deluge-type sulphur spray and a shaped member disposed therein adjacent said nozzle opening for mixing said molten sulphur; and b. a water jacket circumferentially disposed about said sulphur conduit adjacent said spray head so as to form an annular orifice behind said nozzle opening.

8. The device of claim 7 wherein said shaped member is shaped so as to cause said molten sulphur to travel in a curvilinear path.

9. The device for preparing granular sulphur of claim 7 wherein said shaped member is helically shaped.

* * * * *